United States Patent
Kamei et al.

(10) Patent No.: US 6,810,584 B2
(45) Date of Patent: Nov. 2, 2004

(54) HEAT-SHRINKABLE TUBE, HEAT-SHRINKABLE SHEET, AND METHOD OF SHRINKING THE SAME

(75) Inventors: Koji Kamei, Kawasaki (JP); Norihiko Ono, Yokohama (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 09/873,611

(22) Filed: Jun. 4, 2001

(65) Prior Publication Data

US 2002/0013103 A1 Jan. 31, 2002

(30) Foreign Application Priority Data

Jun. 6, 2000 (JP) ........................................ 2000-169307

(51) Int. Cl.[7] .......................... H01R 43/00; B65B 53/00
(52) U.S. Cl. .......................... 29/869; 29/825; 428/34.7; 428/34.9; 428/457
(58) Field of Search .......................... 29/868, 869, 872, 29/825; 428/34.1, 34.4, 34.5, 34.6, 34.7, 37.9, 457, 469; 219/633, 634

(56) References Cited

U.S. PATENT DOCUMENTS

| | | | |
|---|---|---|---|
| 4,555,422 A | 11/1985 | Nakamura | |
| 5,126,521 A | 6/1992 | McGaffigan | |
| 5,189,271 A | * | 2/1993 | Derbyshire ................. 219/633 |
| 5,481,799 A | 1/1996 | McGaffigan | |
| 6,379,810 B1 | * | 4/2002 | Hiramoto et al. ........... 428/469 |

FOREIGN PATENT DOCUMENTS

EP       1 020 878 A1      9/2000

OTHER PUBLICATIONS

Copy of European Search Report, dated Sep. 18, 2001.

Han S.H. et al., Soft Magnetic Properties of FE–(Si3N4, Al2O3) Thin Films, IEEE Transactions on Magnetics, IEEE Inc., New York, NY. vol. 32, No. 5, pp. 4499–4501, Sep. 1, 1996.

* cited by examiner

*Primary Examiner*—Ljiljana Ciric
(74) *Attorney, Agent, or Firm*—Bradley N. Ruben (57) ABSTRACT

In a heat-shrinkable tube (1) having a tubular member which is shrinkable in response to heat and has a cylindrical surface, a thin film is formed on at least a part of the cylindrical surface. The thin film is made of a magnetic loss material which has a high magnetic loss characteristic. The thin film has a first phase comprising a first one of Fe, Co, and Ni and has a second phase comprising an insulator containing at least one element other than Fe, Co, and Ni.

16 Claims, 6 Drawing Sheets

HEAT-SHRINKABLE TUBE, HEAT-SHRINKABLE SHEET, AND METHOD OF SHRINKING THE SAME

BACKGROUND OF THE INVENTION

This invention relates to a heat-shrinkable tube and a heat-shrinkable sheet each of which can be used for insulating and/or protecting a connecting portion between wires or cables, and to methods of shrinking the tube and sheet, respectively.

Generally, the cables have conductors and insulators coating on the conductors for insulating and protecting the conductors, respectively. In order to connect the cables to each other, the insulators must be partially removed from a connecting portion between the cables to establish electric connection between the conductors. Therefore, it is assumed that the conductors are exposed as an exposed part in the connecting portion.

For assuring electric insulation of the exposed part from surroundings, use is sometimes made of a heat-shrinkable tube. The heat-shrinkable tube is produced by a process comprising the steps of forming a thermoplastic polymeric material, such as polyethelene, into a tubular member having a tubular shape, cross-linking the thermoplastic polymeric material of the tubular member to an appropriate extent, expanding or stretching the tubular member at a temperature not lower than a softening point thereof to form an expanded tubular member having an expanded shape, and cooling the expanded tubular member to a room temperature with its expanded shape maintained. When the heat-shrinkable tube thus obtained is heated again to the temperature not lower than the softening point, the heat-shrinkable tube tries to recover its initial shape before expansion. In other words, the heat-shrinkable tube shrinks when it is heated. Therefore, if the heat-shrinkable tube is used in the connecting portion of interconnection between the cable and the object, it is possible to form a protection/insulation layer tightly fitted to an outer periphery of the connecting portion.

Through the similar process, a heat-shrinkable sheet is also produced and used in addition to the heat-shrinkable tube. The heat-shrinkable tube or the heat-shrinkable sheet is used not only in the connecting portion of interconnection between the cable and the object as mentioned above but also in various other fields.

In a heating operation for the purpose of shrinking the heat-shrinkable tube or the heat-shrinkable sheet when it is used, use may be made of a special electric heater designed therefor. Sometimes, an ordinary electric heater such as a hair drier or a gas torch is used. In the latter case, the result of the heating operation largely depends upon the skill of an operator. If uniform heating is unsuccessful, deformation or local "scorch" may be caused to occur. In the worst case, the tube will be broken.

In the meanwhile, a connecting operation for connecting a telephone cable extended between utility poles requires the operator to work at a high place. In this event, another risk is associated with such high-place work in addition to the above-mentioned trouble in the heating operation itself. Depending upon a working place, it may be very difficult to use the heater of the above-mentioned type in the heating operation.

SUMMARY OF THE INVENTION

It is therefore an object of this invention to provide a heat-shrinkable tube and a heat-shrinkable sheet which enable a shrinkage-inducing operation to be reliably and efficiently performed irrespective of the skill of an operator.

It is another object of this invention to provide a heat-shrinkable tube and a heat-shrinkable sheet which facilitate a heating operation.

It is still another object of this invention to provide a shrinking method for the heat-shrinkable tube and the heat-shrinkable sheet mentioned above.

Other objects of the present invention will become clear as the description proceeds.

According to an aspect of the present invention, there is provided a heat-shrinkable tube which comprises a tubular member being shrinkable in response to heat and having a cylindrical surface, and a thin film formed on at least a part of the cylindrical surface and made of a magnetic loss material which has a high magnetic loss characteristic. The thin film has a first phase comprising a first one of Fe, Co, and Ni and has a second phase comprising an insulator containing at least one element other than Fe, Co, and Ni.

According to another aspect of the present invention, there is provided a heat-shrinkable sheet which comprises a sheet member in response to heat and having a flat surface, and a thin film formed on at least a part of the flat surface and made of a magnetic loss material which has a high magnetic loss characteristic. The thin film has a first phase comprising a first one of Fe, Co, and Ni and has a second phase comprising an insulator containing at least one element other than Fe, Co, and Ni.

According to still another aspect of the present invention, there is provided a method of shrinking the heat-shrinkable tube, comprising the steps of disposing an oscillator in the vicinity of the thin film and making the oscillator irradiate electromagnetic radiation towards the thin film, so that the thin film generates the heat.

According to yet another aspect of the present invention, there is provided a method of shrinking a heat-shrinkable tube, comprising the steps of disposing a conductive wire in vicinity of the thin film and supplying an alternating current to the conductive wire to make the conductive wire irradiate electromagnetic radiation towards the thin film, so that the thin film generates the heat.

According to a further aspect of the present invention, there is provided a method of shrinking the heat-shrinkable sheet, comprising the steps of disposing an oscillator in the vicinity of the thin film and making the oscillator irradiate electromagnetic radiation towards the thin film, so that the thin film generates the heat.

According to a still further aspect of the present invention, there is provided a method of shrinking a heat-shrinkable sheet, comprising the steps of disposing a conductive wire in vicinity of the thin film and supplying an alternating current to the conductive wire to make the conductive wire irradiate electromagnetic radiation towards the thin film, so that the thin film generates the heat.

DESCRIPTION OF THE PREFERRED EMBODIMENTS

Figure 1:
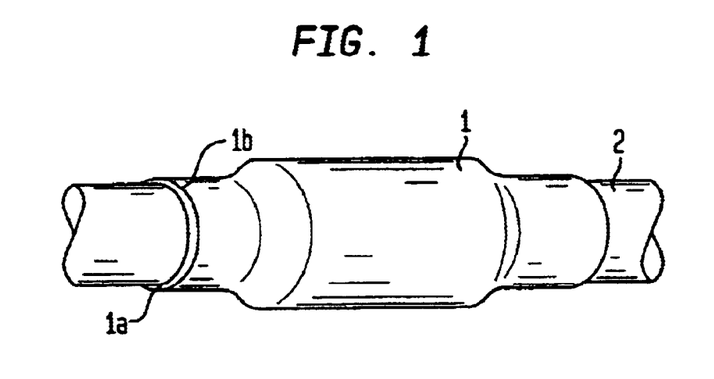
FIG. 1 is a perspective view of a heat-shrinkable tube according to a first embodiment of this invention when it is used.

Referring to FIG. 1, description will be made of a heat-shrinkable tube according to a first embodiment of this invention.

In FIG. 1, the heat-shrinkable tube depicted by a reference numeral 1 is applied to a connecting portion of interconnection between communication cables 2. The heat-shrinkable tube 1 was produced by a process which will presently be described.

At first, a thin film of a magnetic loss material was deposited to a thickness of 5 μm by sputtering by the use of a disk-shaped Fe target and a chip-like $Al_2O_3$ target. It is noted here that the magnetic loss material is a magnetic shielding material having a high magnetic loss characteristic. The depositing condition of the thin film is shown in Table 1.

TABLE 1

| | | |
|---|---|---|
| Vacuum Degree before Deposition | $10^{-6}$ Torr or less | |
| Atmosphere during Deposition | Ar | |
| Power Supply | RF | |
| Target | Fe | φ 100 mm |
| | $Al_2O_3$ | 5 mm × 5 mm × 2 mm |

The thin film was subjected to the fluorescent X-ray analysis to examine the composition thereof. As a result, the composition of $Fe_{72}Al_{11}O_{17}$ was observed. It has also been found out that the thin film comprises a first phase of Fe and a second phase of $Al_2O_3$ and that the second phase is a continuous phase while the first phase is dispersed in the second phase. The impedance of the thin film was measured to examine the frequency-dependent characteristic of an imaginary part ($\mu''$) of a complex permeability ($\mu=\mu'+j\mu''$). As a result, it has been revealed that the resonance frequency is around 700 MHz. Herein, the imaginary part of the complex permeability is a factor contributing to the magnetic loss characteristic and may be called a loss term.

Next, a material comprising a mixture of low-density polyethylene and dicumyl peroxide was prepared and formed into a tubular member 1a having a thickness of 1 mm and an outer diameter of 10 mm. Through a cross-linking reaction and an expanding step, an expanded tubular member having a thickness of 0.85 mm and an outer diameter of 30 mm was obtained. The above-mentioned thin film was transferred and adhered, as depicted by reference numeral 1b, to an outer one of cylindrical surfaces of the tubular member 1a to obtain the heat-shrinkable tube 1.

When the heat-shrinkable tube 1 is irradiated by electromagnetic radiation having a frequency around the resonance frequency of the thin film, the thin film generates heat. Therefore, after the heat-shrinkable tube 1 is fitted to an outer periphery of the connecting portion of interconnection between the communication cables 2, it is possible to easily shrink the heat-shrinkable tube 1 without using any special heater. For example, an oscillator (not shown) for producing the electromagnetic radiation is disposed in the vicinity of the thin film of the heat-shrinkable tube 1. By driving the oscillator to irradiate the electromagnetic radiation onto the thin film, the thin film generates heat. Alternatively, it is possible to make use of the electromagnetic radiation emitted from a transmission line disposed in the vicinity of the thin film or a power supply connected to the transmission line. At any rate, since the shrinkage of the heat-shrinkable sheet 3 can be triggered from a remote place, it is possible to remarkably improve the safety during a work on a utility pole or a work for an underground communication cable.

When the thin film generates heat, the heat-shrinkable tube 1 shrinks. As a result, a protection/insulation layer is formed around the connecting portion of interconnection between the communication cables 2. This layer comprises a magnetic loss material so as to exhibit a high-frequency noise shielding function. For example, the heat-shrinkable tube having an outer diameter of 30 mm is applicable to the connecting portion of interconnection between data communication cables each having an outer diameter of about 20 mm.

The thin film of the magnetic loss material may be formed throughout an entire area of the cylindrical surfaces of the tubular member or locally, for example, in a lattice pattern. Furthermore, the thin film may be formed only in at least a part of one or both of the cylindrical surfaces of the tubular member.

Next referring to FIGS. 2 and 3, description will be made of a heat-shrinkable sheet according to a second embodiment of this invention.

Figure 2:
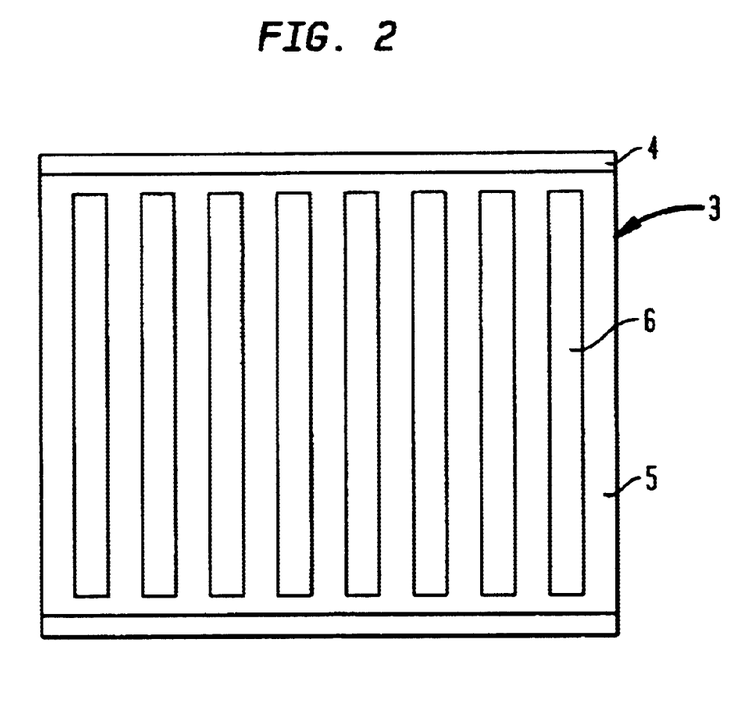
FIG. 2 is a plan view of a heat-shrinkable sheet according to a second embodiment of this invention.
Figure 3:
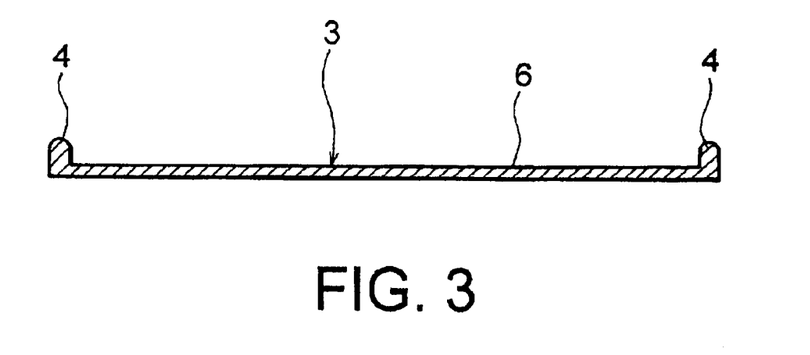
FIG. 3 is a sectional view of the heat-shrinkable sheet illustrated in FIG. 2.

The heat-shrinkable sheet depicted by a reference numeral 3 in FIGS. 2 and 3 was produced by a process which will presently be described.

A material comprising a mixture of low-density polyethylene and dicumyl peroxide was prepared and formed into a sheet member having a pair of ribs 4 thereof. Through a cross-linking reaction and an expanding step, an expanded sheet member 5 was obtained. On one of flat surfaces of the expanded sheet member 5, a thin film 6 of a magnetic loss material similar to that used in production of the heat-shrinkable tube in FIG. 1 is transferred as thin film segments in a stripe pattern. Like the thin film of the heat-shrinkable tube illustrated in FIG. 1, the thin film 6 comprises a first phase of Fe and a second phase of $Al_2O_3$ and that the second phase is a continuous phase while the first phase is dispersed in the second phase. For example, the heat-shrinkable sheet 3 has a dimension of 150 mm×170 mm. The thin film 6 is formed as the thin film segments each of which has a width of 10 mm and which are arranged at spaces of 10 mm.

Figure 4:
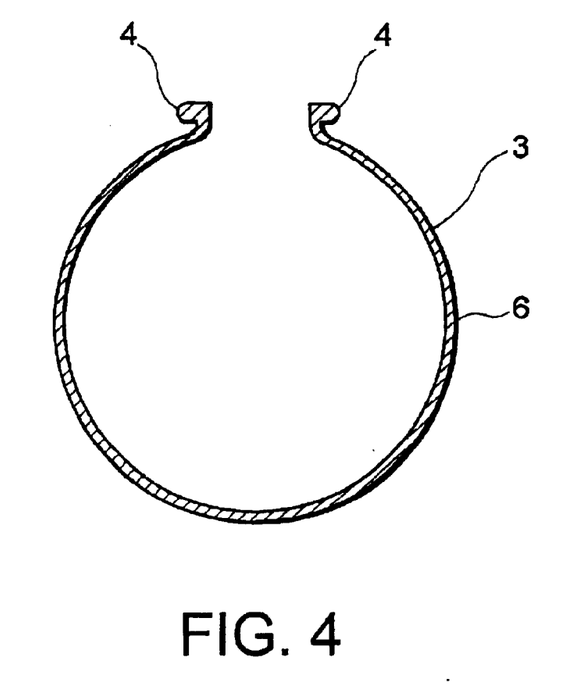
FIG. 4 is a sectional view of the heat-shrinkable sheet illustrated in FIG. 2 when it is rolled.

The heat-shrinkable sheet 3 has the rib 4 formed at the opposite ends thereof. When the heat-shrinkable sheet 3 is used, the heat-shrinkable sheet 3 is rolled so that the ribs 4 face each other, as illustrated in FIG. 4. The ribs 4 are fixed to each other by a clip-like jig (not shown) to bring the heat-shrinkable sheet 3 into a cylindrical shape. The heat-shrinkable sheet 3 is advantageous in that the connecting portion of interconnection between the communication cables can be covered by the heat-shrinkable sheet 3 even after the communication cables 2 have been connected to each other.

After the heat-shrinkable sheet 3 is rolled into the cylindrical shape to cover the connecting portion of interconnection between the communication cables 2, it is possible to easily shrink the heat-shrinkable sheet 3 without using a special heater. For example, an oscillator (not shown) for producing electromagnetic radiation is disposed in the vicinity of the thin film of the heat-shrinkable sheet 3. By driving the oscillator to irradiate the electromagnetic radiation onto the thin film, the thin film generates heat. Alternatively, it is possible to make use of the electromagnetic radiation emitted from a transmission line disposed in the vicinity of the thin film or a power supply connected to the transmission line. At any rate, since the shrinkage of the heat-shrinkable sheet 3 can be triggered from a remote place, it is possible to remarkably improve the safety during a work on a utility pole or a work for an underground communication cable.

Heat generation in the thin film causes the shrinkage of the heat-shrinkable sheet 3. As a result, a protection/insulation layer is formed around the connecting portion of interconnection between the communication cables 2. This layer comprises a magnetic loss material so as to exhibit a high-frequency noise shielding function.

The thin film of the magnetic loss material may be formed throughout an entire area of the flat surfaces of the sheet member or locally, for example, in a lattice pattern. Furthermore, the thin film may be formed only in at least a part of one or both of the flat surfaces of the sheet member.

In the foregoing embodiments, the thin film is deposited by sputtering. It will be noted that use may be made of other various techniques, such as gas deposition, CVD, and vapor deposition. In the foregoing, the thin film is transferred after it is deposited separately. Alternatively, the thin film can be applied after it is pulverized.

In the foregoing, the first phase comprises Fe. Alternatively, use may be made of Co, Ni, or a mixture of a plurality of elements selected from Fe, Co, and Ni. The second phase is an insulator containing at least one element other than the element or elements contained in the first phase.

Next, various examples of the magnetic loss material will be described in detail.

The magnetic loss material exhibits the conductivity within a frequency range smaller than several tens MHz. As the magnetic loss material, use may be made of a narrow-band magnetic loss material which has an M-X-Y composition as a mixture of components M (M being at least one of Fe, Co, and Ni), Y (Y being at least one of F, N, and O), and X (X being at least one element other than those contained in M and Y) and which has a permeability characteristic, given as a relationship between a frequency and an imaginary part $\mu''$ with respect to a real part $\mu'$ of relative permeability, such that the maximum value $\mu''_{max}$ of the imaginary part $\mu''$ (which may be called a magnetic loss term) is present within a frequency range between 100 MHz and 10 GHz and that a relative bandwidth bwr is not greater than 200% where the relative bandwidth bwr is obtained by extracting a frequency bandwidth between two frequencies at which the value of $\mu''$ is 50% of the maximum $\mu''_{max}$ and normalizing the frequency bandwidth at the center frequency thereof. It is assumed here that the narrow-band magnetic loss material has saturation magnetization between 80% and 60% of that of a metal magnetic material comprising the component M alone and a d.c. electric resistance between 100 $\mu\Omega$·cm and 700 $\mu\Omega$·cm.

As the magnetic loss material, use may also be made of a wide-band magnetic loss material which has an M-X-Y composition as a mixture of components M (M being at least one of Fe, Co, and Ni), Y (Y being at least one of F, N, and O), and X (X being at least one element other than those contained in M and Y) and which has a permeability characteristic, given as a relationship between a frequency and an imaginary part $\mu''$ with respect to a real part $\mu'$ of relative permeability, such that the maximum value $\mu''_{max}$ of the imaginary part $\mu''$ is present within a frequency range between 100 MHz and 10 GHz and that a relative bandwidth bwr is not smaller than 150% where the relative bandwidth bwr is obtained by extracting a frequency bandwidth between two frequencies at which the value of $\mu''$ is 50% of the maximum $\mu''_{max}$ and normalizing the frequency bandwidth at the center frequency thereof. It is assumed here that the wide-band magnetic loss material has saturation magnetization between 60% and 35% of that of a metal magnetic material comprising the component M alone and a d.c. electric resistance greater than 500 $\mu\Omega$·cm.

In each of the narrow-band magnetic loss material and the wide-band magnetic loss material, the component X is at least one of C, B, Si, Al, Mg, Ti, Zn, Hf, Sr, Nb, Ta, and rare earth elements. The component M is present in a granular structure where particles or grains of the component M are dispersed in a matrix of a compound of the components X and Y. The particles have an average particle size between 1 nm and 40 nm. The narrow-band or the wide-band magnetic loss material has an anisotropic magnetic field of 47400 A/m or less. Preferably, the M-X-Y composition of the wide-band or the narrow-band magnetic loss material is an Fe—Al—O composition or an Fe—Si—O composition.

In the foregoing, description has been made of the case where the semiconductor integrated circuit device is used as the electronic component. However, this invention is also applicable if the electronic component is a different semiconductor active device including a semiconductor large-scale integrated circuit device, a logic circuit device such as a microprocessor, a central processing unit, and a image processor arithmetic logic unit, or the like.

The radiator may be attached to the circuit board or a housing to which the electronic component is mounted.

In either event, as each of the high-frequency current suppressors 2 and 3, use is made of a thin-film magnetic substance which is small in volume and which is a magnetic loss material having a large imaginary part (i.e., a "magnetic loss term") $\mu$" of the relative permeability. As a magnetic substance which can be increased in magnetic loss term, a granular magnetic material is known. Specifically, in case where the concentration of magnetic metal particles in the granular magnetic material falls within a particular range, excellent magnetic loss characteristic can be obtained in a high-frequency region.

Next, description will be made as to granular structure and production methods of M-X-Y magnetic composition.

Figure 5:
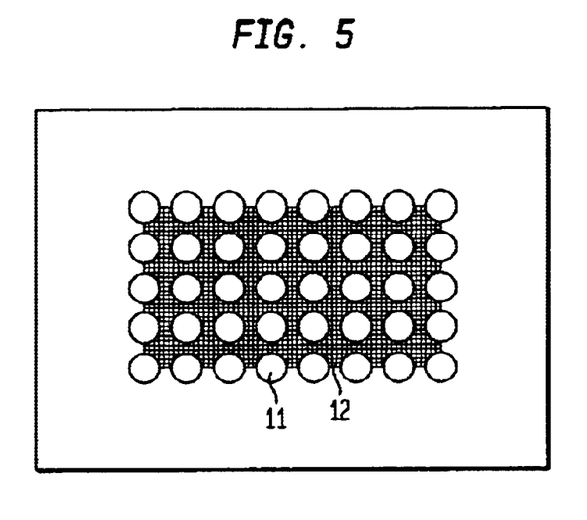
FIG. 5 is a schematic view showing a granular structure of M-X-Y magnetic composition.

Referring to FIG. 5 in which schematically shows the granular structure of M-X-Y magnetic composition, particles 11 of metallic magnetic material M are uniformly or evenly distributed in a matrix 12 consisting of X and Y.

Figure 6A:
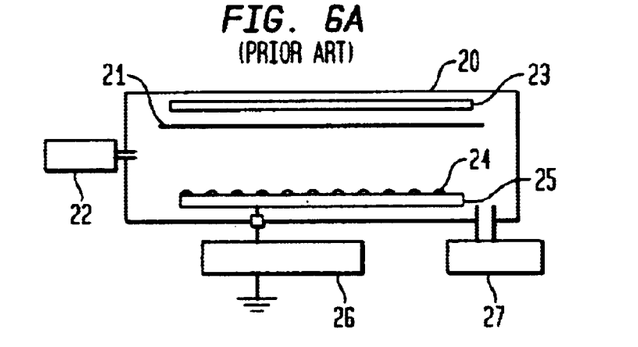
FIG. 6A is a schematic sectional view showing a structure of a sputtering apparatus which was used in examples.

Referring to FIG. 6A, a sputtering apparatus shown therein was used for producing samples in the following examples and comparative examples. The sputtering apparatus has a conventional structure and comprises a vacuum container 20, a shutter 21, an atmospheric gas source 22, a substrate or a glass plate 23, chips 24 (X or X-Y), a target 25 (M), an RF power source, and a vacuum pump 27. The atmospheric gas source 22 and the vacuum pump 27 are connected to the vacuum container 20. The substrate 23 confronts to the target 25 on which chips 24 are disposed. The shutter 21 is disposed in front of the substrate 21. The RF power source 26 is connected to the target 25.

Figure 6B:
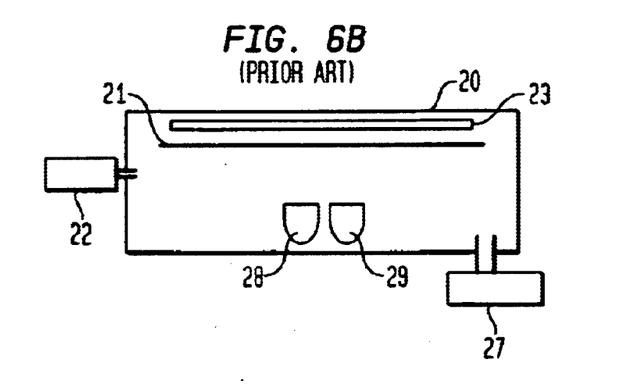
FIG. 6B is a schematic sectional view showing a structure of a vapor deposition apparatus which was used in examples.

Referring to FIG. 6B, a vapor deposition apparatus shown therein was also used another apparatus for producing samples in the following examples and comparative examples. The vapor deposition apparatus has a conventional structure and has vacuum container 20, atmospheric gas source 22, and vacuum pump 27 similar to the sputtering apparatus but has a crucible 28 including materials (X-Y) in place of chips 24, target 25 and RF power source 26.

EXAMPLE 1

A thin film of M-X-Y magnetic composition was made on a glass plate by use of the sputtering apparatus shown in FIG. 6A at a sputtering condition shown in Table 2.

TABLE 2

| | |
|---|---|
| Vacuum degree before sputtering | <1 × 10$^{-6}$ Torr |
| Atmosphere | Ar gas |
| Electric Power | RF |
| Targets | Fe (diameter of 100 mm) and Al$_2$O$_3$ chip (120 pieces) (chip size: 5 mm × 5 mm × 2 mm) |

The film sample 1 produced was analyzed by a fluorescent X-ray spectroscopy and confirmed as a film of a composition Fe$_{72}$Al$_{11}$O$_{17}$. The film sample 1 had 2.0 micrometer ($\mu$m) in thickness, 530 micro ohm centimeters ($\mu\Omega$·cm) in DC specific resistance, 18 Oe in anisotropy field (Hk), and 16,800 Gauss in saturation magnetization (Ms).

A percent ratio of the saturation magnetization of the film sample 1 and that of the metallic material M itself {Ms(M-X-Y)/Ms(M)}×100 was 72.2%.

Figure 7:
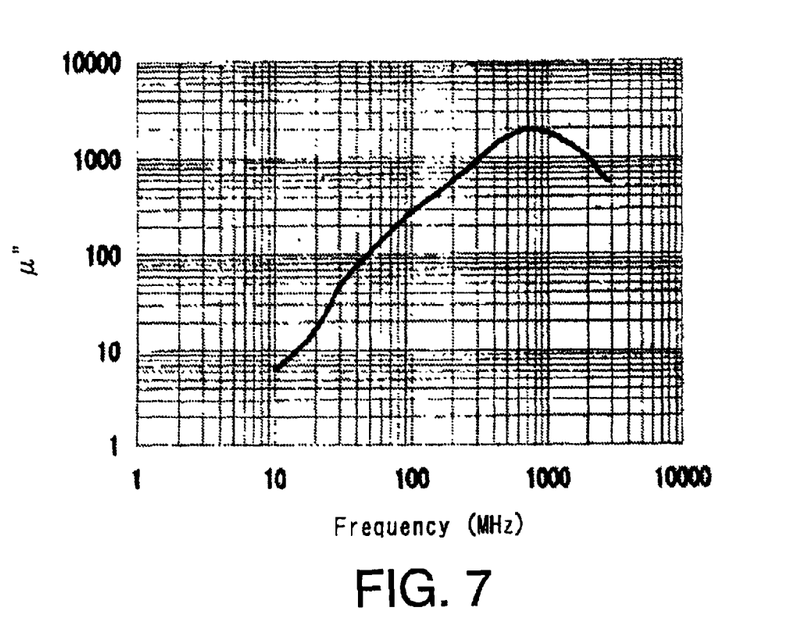
FIG. 7 is a graphical view showing a permeability frequency response of film sample 1 in Example 1.

In order to measure a permeability frequency response, the film sample 1 was formed in a ribbon like form and inserted in a coil. Under application of a bias magnetic field, an impedance variation of the coil was measured in response to frequency change of AC current applied to the coil. The measurement was several times for different values of the bias magnetic field. From the measured impedance variation in response to frequency variation, the permeability frequency response ($\mu$"—f response) was calculated and is shown in FIG. 7. It will be noted from FIG. 7 that the imaginary part of relative permeability has a high peak or the maximum value ($\mu''_{max}$) and rapidly falls either side of the peak. The natural resonance frequency (f($\mu''_{max}$)) showing the maximum value ($\mu''_{max}$) is about 700 MHz. From the $\mu$"—f response, a relative bandwidth bwr was determined as a percentage ratio of bandwidth between two frequency points which shows the imaginary part of relative permeability as a half value $\mu''_{50}$ of the maximum value $\mu''_{max}$, to center frequency of said bandwidth. The relative bandwidth bwr was 148%.

EXAMPLE 2

In a condition similar to that in Example 1 but using of 150 Al$_2$O$_3$ chips, a film sample 2 was formed on a glass plate.

The film sample 2 produced was analyzed by a fluorescent X-ray spectroscopy and confirmed as a film of a composition Fe$_{44}$Al$_{22}$O$_{34}$. The film sample 2 had 1.2 micrometer ($\mu$m) in thickness, 2400 micro ohm centimeters ($\mu\Omega$·cm) in DC specific resistance, 120 Oe in anisotropy field (Hk), and 9600 Gauss in saturation magnetization (Ms). It will be noted that film sample 2 is higher than film sample 1 in the specific resistance.

A percent ratio of the saturation magnetization of the film sample 2 and that of the metallic material M itself {Ms(M-X-Y)/Ms(M)}×100 was 44.5%.

Figure 8:
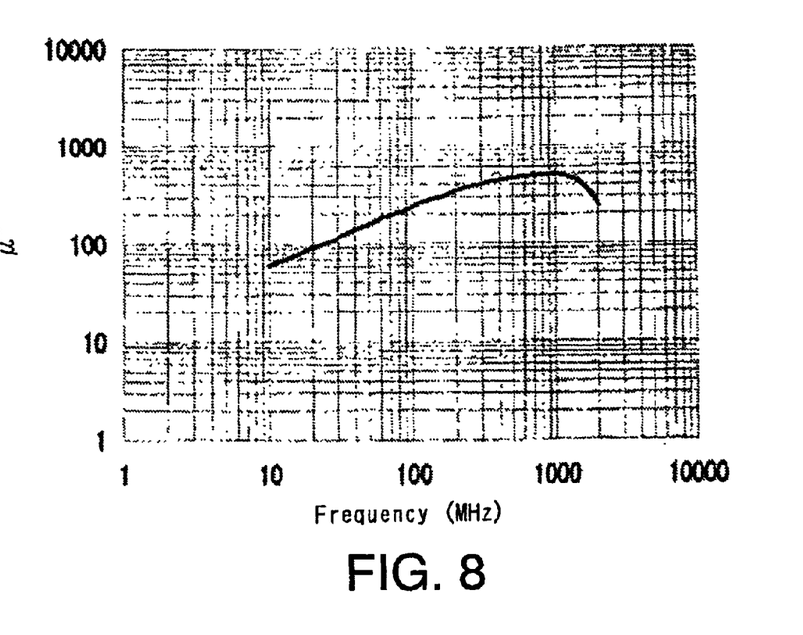
FIG. 8 is a graphical view showing a permeability frequency response of film sample 2 in Example 2.

The $\mu$"—f response of film sample 2 was also obtained in the similar manner as in Example 1 and shows in FIG. 8. It is noted that the peak has also a high value similar to that in film sample 1. However, the frequency point at the peak, or the natural resonance frequency is about 1 GHz and the imaginary part of relative permeability gradually falls either side of the peak so that the $\mu$"—f response has a broadband characteristic.

A relative bandwidth bwr of film sample 2 was also confirmed as 181% by the similar way as in Example 1.

Comparative Example 1

In a condition similar to that in Example 1 but using of 90 Al$_2$O$_3$ chips, a comparative sample 1 was formed on a glass plate.

The comparative sample 1 produced was analyzed by a fluorescent X-ray spectroscopy and confirmed as a film of a composition Fe$_{86}$Al$_6$O$_8$. The comparative sample 1 had 1.2 micrometer ($\mu$m) in thickness, 74 micro ohm centimeters ($\mu\Omega$·cm) in DC specific resistance, 22 Oe in anisotropy field (Hk), 18,800 Gauss in saturation magnetization (Ms), and 85.7% in a percent ratio of the saturation magnetization of the comparative sample 1 and that of the metallic material M itself {Ms(M-X-Y)/Ms(M)}×100, and was 44.5%.

Figure 9:
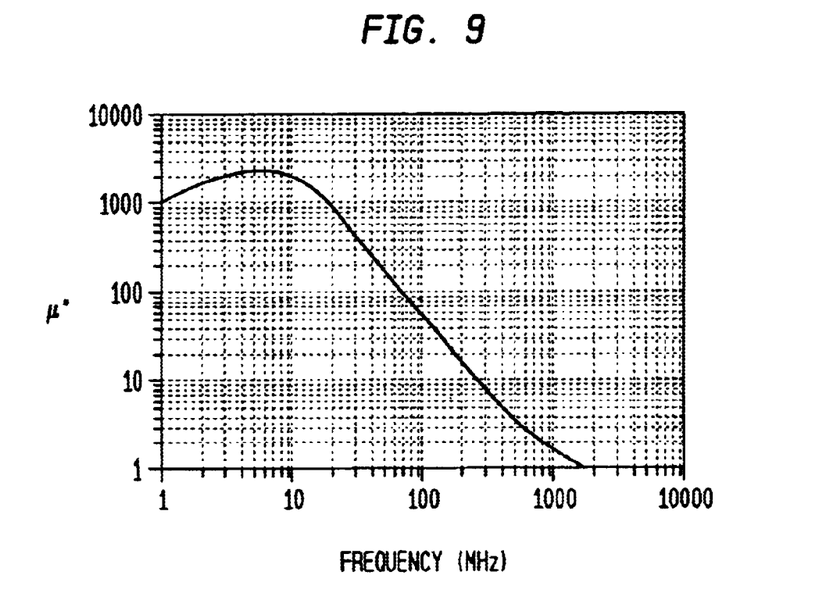
FIG. 9 is a graphical view showing a permeability frequency response of comparable sample 1 in Comparable Example 1.

The $\mu$"—f response of comparative sample 1 was also obtained in the similar manner as in Example 1, and is shown in FIG. 9. It will be noted from FIG. 9 that the imaginary part $\mu$" of relative permeability of the comparative sample 1 has a high peak at a frequency about 10 MHz but rapidly reduces at the higher frequency range than 10 MHz. It can be supposed that this reduction is caused by generation of eddy current due to the lower specific resistance.

Comparative Example 2

In a condition similar to that in Example 1 but using of 200 Al$_2$O$_3$ chips, a comparative sample 2 was formed on a glass plate.

The comparative sample 2 produced was analyzed by a fluorescent X-ray spectroscopy and confirmed as a film of a composition Fe$_{19}$Al$_{34}$O$_{47}$. The comparative sample 2 had 1.3 micrometer ($\mu$m) in thickness, 10,500 micro ohm centimeters ($\mu\Omega$·cm) in DC specific resistance.

The magnetic characteristic of comparative sample 1 exhibited superparamagnetism.

EXAMPLE 4

A thin film of M-X-Y magnetic composition was made on a glass plate by the reactive sputtering method using the sputtering apparatus shown in FIG. 6A at a sputtering condition shown in Table 3. The partial pressure ratio of $N_2$ was 20%. The thin film was heat-treated at a temperature of 300° C. for two hours in vacuum under magnetic field and obtained a film sample 4.

TABLE 3

| | |
|---|---|
| Vacuum degree before sputtering | <1 × 10⁻⁶ Torr |
| Atmosphere | Ar + $N_2$ gas |
| Electric Power | RF |
| Targets | Fe (diameter of 100 mm) and Al chip (150 pieces) (chip size: 5 mm × 5 mm × 2 mm) |

The properties of film sample 4 are show in Table 4.

TABLE 4

| | |
|---|---|
| Film thickness | 1.5 μm |
| {Ms(M-X-Y)/Ms(M)} × 100 | 51.9% |
| $\mu''_{max}$ | 520 |
| $f(\mu''_{max})$ | 830 MHz |
| bwr | 175% |

EXAMPLE 5

A thin film of M-X-Y magnetic composition was made on a glass plate by using the sputtering apparatus shown in FIG. 6A at a sputtering condition shown in Table 5. The thin film was heat-treated at a temperature of 300° C. for two hours in vacuum under magnetic field and obtained a film sample 5.

TABLE 5

| | |
|---|---|
| Vacuum degree before sputtering | <1 × 10⁻⁶ Torr |
| Atmosphere | Ar gas |
| Electric Power | RF |
| Targets | Co (diameter of 100 mm) and $Al_2O_3$ chip (130 pieces) (chip size: 5 mm × 5 mm × 2 mm) |

The properties of film sample 5 are show in Table 6.

TABLE 6

| | |
|---|---|
| Film thickness | 1.1 μm |
| {Ms(M-X-Y)/Ms(M)} × 100 | 64.7% |
| $\mu''_{max}$ | 850 |
| $f(\mu''_{max})$ | 800 MHz |
| bwr | 157% |

EXAMPLE 6

A thin film of M-X-Y magnetic composition was made on a glass plate by the reactive sputtering method using the sputtering apparatus shown in FIG. 6A at a sputtering condition shown in Table 7. The partial pressure ratio of $N_2$ was 10%. The thin film was heat-treated at a temperature of 300° C. for two hours in vacuum under magnetic field and obtained a film sample 6.

TABLE 7

| | |
|---|---|
| Vacuum degree before sputtering | <1 × 10⁻⁶ Torr |
| Atmosphere | Ar + $N_2$ gas |
| Electric Power | RF |
| Targets | Co (diameter of 100 mm) and Al chip (170 pieces) (chip size: 5 mm × 5 mm × 2 mm) |

The properties of film sample 6 are show in Table 8.

TABLE 8

| | |
|---|---|
| Film thickness | 1.2 μm |
| {Ms(M-X-Y)/Ms(M)} × 100 | 32.7% |
| $\mu''_{max}$ | 350 |
| $f(\mu''_{max})$ | 1 GHz |
| bwr | 191% |

EXAMPLE 7

A thin film of M-X-Y magnetic composition was made on a glass plate by using the sputtering apparatus shown in FIG. 6A at a sputtering condition shown in Table 9. The thin film was heat-treated at a temperature of 300° C. for two hours in vacuum under magnetic field and obtained a film sample 7.

TABLE 9

| | |
|---|---|
| Vacuum degree before sputtering | <1 × 10⁻⁶ Torr |
| Atmosphere | Ar gas |
| Electric Power | RF |
| Targets | Ni (diameter of 100 mm) and $Al_2O_3$ chip (140 pieces) (chip size: 5 mm × 5 mm × 2 mm) |

The properties of film sample 4 are show in Table 10.

TABLE 10

| | |
|---|---|
| Film thickness | 1.7 μm |
| {Ms(M-X-Y)/Ms(M)} × 100 | 58.2% |
| $\mu''_{max}$ | 280 |
| $f(\mu''_{max})$ | 240 MHz |
| bwr | 169% |

EXAMPLE 8

A thin film of M-X-Y magnetic composition was made on a glass plate by the reactive sputtering method using the sputtering apparatus shown in FIG. 6A at a sputtering condition shown in Table 11. The partial pressure ratio of $N_2$ was 10%. The thin film was heat-treated at a temperature of 300° C. for two hours in vacuum under magnetic field and obtained a film sample 8.

TABLE 11

| | |
|---|---|
| Vacuum degree before sputtering | <1 × 10⁻⁶ Torr |
| Atmosphere | Ar + $N_2$ gas |
| Electric Power | RF |
| Targets | Ni (diameter of 100 mm) and Al chip (100 pieces) (chip size: 5 mm × 5 mm × 2 mm) |

The properties of film sample 10 are show in Table 12.

TABLE 12

| | |
|---|---|
| Film thickness | 1.3 μm |
| {Ms(M-X-Y)/Ms(M)} × 100 | 76.2% |
| $\mu''_{max}$ | 410 |
| f($\mu''_{max}$) | 170 MHz |
| bwr | 158% |

EXAMPLE 9

A thin film of M-X-Y magnetic composition was made on a glass plate by using the sputtering apparatus shown in FIG. 6A at a sputtering condition shown in Table 13. The thin film was heat-treated at a temperature of 300° C. for two hours in vacuum under magnetic field and obtained a film sample 9.

TABLE 13

| | |
|---|---|
| Vacuum degree before sputtering | <1 × 1$^{-6}$ Torr |
| Atmosphere | Ar gas |
| Electric Power | RF |
| Targets | Fe (diameter of 100 mm) and TiO$_2$ chip (150 pieces) (chip size: 5 mm × 5 mm × 2 mm) |

The properties of film sample 9 are show in Table 14.

TABLE 14

| | |
|---|---|
| Film thickness | 1.4 μm |
| {Ms(M-X-Y)/Ms(M)} × 100 | 43.6% |
| $\mu''_{max}$ | 920 |
| f($\mu''_{max}$) | 1.5 GHz |
| bwr | 188% |

EXAMPLE 10

A thin film of M-X-Y magnetic composition was made on a glass plate by the reactive sputtering method using the sputtering apparatus shown in FIG. 6A at a sputtering condition shown in Table 15. The partial pressure ratio of O$_2$ was 15%. The thin film was heat-treated at a temperature of 300° C. for two hours in vacuum under magnetic field and obtained a film sample 10.

TABLE 15

| | |
|---|---|
| Vacuum degree before sputtering | <1 × 1$^{-6}$ Torr |
| Atmosphere | Ar + O$_2$ gas |
| Electric Power | RF |
| Targets | Fe (diameter of 100 mm) and Si chip (130 pieces) (chip size: 5 mm × 5 mm × 2 mm) |

The properties of film sample 10 are show in Table 16.

TABLE 16

| | |
|---|---|
| Film thickness | 1.5 μm |
| {Ms(M-X-Y)/Ms(M)} × 100 | 55.2% |
| $\mu''_{max}$ | 920 |
| f($\mu''_{max}$) | 1.2 GHz |
| bwr | 182% |

EXAMPLE 11

A thin film of M-X-Y magnetic composition was made on a glass plate by using the sputtering apparatus shown in FIG. 6A at a sputtering condition shown in Table 17. The thin film was heat-treated at a temperature of 300° C. for two hours in vacuum under magnetic field and obtained a film sample 11.

TABLE 17

| | |
|---|---|
| Vacuum degree before sputtering | <1 × 10$^{-6}$ Torr |
| Atmosphere | Ar gas |
| Electric Power | RF |
| Targets | Fe (diameter of 100 mm) and HfO$_3$ chip (100 pieces) (chip size: 5 mm × 5 mm × 2 mm) |

The properties of film sample 11 are show in Table 18.

TABLE 18

| | |
|---|---|
| Film thickness | 1.8 μm |
| {Ms(M-X-Y)/Ms(M)} × 100 | 77.4% |
| $\mu''_{max}$ | 1800 |
| f($\mu''_{max}$) | 450 MHz |
| bwr | 171% |

EXAMPLE 12

A thin film of M-X-Y magnetic composition was made on a glass plate by using the sputtering apparatus shown in FIG. 6A at a sputtering condition shown in Table 19. The thin film was heat-treated at a temperature of 300° C. for two hours in vacuum under magnetic field and obtained a film sample 12.

TABLE 19

| | |
|---|---|
| Vacuum degree before sputtering | <1 × 10$^{-6}$ Torr |
| Atmosphere | Ar gas |
| Electric Power | RF |
| Targets | Fe (diameter of 100 mm) and BN chip (130 pieces) (chip size: 5 mm × 5 mm × 2 mm) |

The properties of film sample 12 are show in Table 20.

TABLE 20

| | |
|---|---|
| Film thickness | 1.9 μm |
| {Ms(M-X-Y)/Ms(M)} × 100 | 59.3% |
| $\mu''_{max}$ | 950 |
| f($\mu''_{max}$) | 680 MHz |
| bwr | 185% |

EXAMPLE 13

A thin film of M-X-Y magnetic composition was made on a glass plate by using the sputtering apparatus shown in FIG. 6A at a sputtering condition shown in Table 21. The thin film was heat-treated at a temperature of 300° C. for two hours in vacuum under magnetic field and obtained a film sample 13.

TABLE 21

| | |
|---|---|
| Vacuum degree before sputtering | <1 × 10$^{-6}$ Torr |
| Atmosphere | Ar gas |
| Electric Power | RF |
| Targets | Fe$_{50}$Co$_{50}$ (diameter of 100 mm) and Al$_2$O$_3$ chip (130 pieces) (chip size: 5 mm × 5 mm × 2 mm) |

The properties of film sample 13 are show in Table 22.

TABLE 22

| Film thickness | 1.6 μm |
|---|---|
| {Ms(M-X-Y)/Ms(M)} × 100 | 59.3% |
| $\mu''_{max}$ | 720 |
| f($\mu''_{max}$) | 1.1 GHz |
| bwr | 180% |

EXAMPLE 14

A thin film of M-X-Y magnetic composition was made on a glass plate by using the vapor deposition apparatus shown in FIG. 6B at a condition shown in Table 23. The thin film was heat-treated at a temperature of 300° C. for two hours in vacuum under magnetic field and obtained a film sample 14.

TABLE 23

| Vacuum degree before sputtering | <1 × 10⁻⁶ Torr |
|---|---|
| Atmosphere flowing rate | O₂ at 3.0 sccm |
| Elements in crucible 28 and 29 | Fe and Al |

The properties of film sample 14 are show in Table 24.

TABLE 24

| Film thickness | 1.1 μm |
|---|---|
| {Ms(M-X-Y)/Ms(M)} × 100 | 41.8% |
| $\mu''_{max}$ | 590 |
| f($\mu''_{max}$) | 520 MHz |
| bwr | 190% |

Now, description will be made as to tests relating to noise suppressing effect of sample films and comparative samples, using a test apparatus shown in FIG. 10.

A test piece was film sample 1 with dimensions of 20 mm×20 mm×2.0 μm. For a comparison, a sheet of known composite magnetic material having dimensions of 20 mm×20 mm×1.0 mm. The composite magnetic material comprising polymer and flat magnetic metal powder dispersed in the polymer. The magnetic metal powder comprises Fe, Al and Si. The composite magnetic material has a permeability distribution in quasi-microwave range and has the maximum value of the imaginary part of relative permeability at a frequency about 700 MHz. Table 25 shows magnetic properties of both of the test piece and comparative test piece.

TABLE 25

|  | Film sample 1 | Comparative test piece |
|---|---|---|
| $\mu''$/700 MHz | about 1800 | about 3.0 |
| bwr | 148 | 196 |

As seen from Table 25, the film sample 1 is about 600 times more than comparative test piece in the maximum value of the imaginary part of relative permeability. Since the noise suppressing effect is generally evaluated from a value of a product ($\mu''_{max}×\delta$) of the maximum value $\mu''_{max}$ of the imaginary part of relative permeability and thickness of the piece δ, the thickness of the comparative test piece of the composite magnetic material sheet was selected 1 mm so that the both of test pieces have the similar values of ($\mu''_{max}×\delta$).

Figure 10:
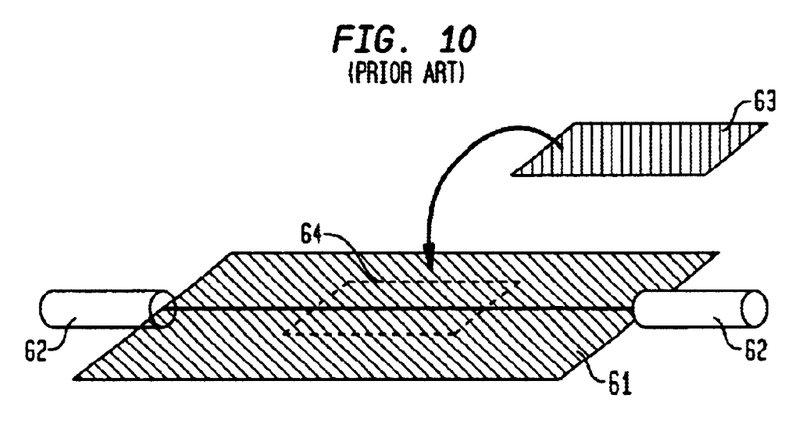
FIG. 10 is a schematic and perspective view of a test apparatus for testing a noise suppressing effect of magnetic samples.

Referring to FIG. 10, the test apparatus comprises a micro-strip line 61 having two ports, coaxial cables 62 connected to the two ports, and a network analyzer (not shown) connected across the two ports. The micro-strip line 61 has a line length of 75 mm and a characteristic impedance of 50 ohms. The test piece 63 was disposed at a region 64 on the micro-strip line 61 and the transmission characteristic S21 was measured. The frequency response of S21 are shown in FIGS. 11A and 11B for film sample 1 and the comparative sample, respectively.

Figure 11A:
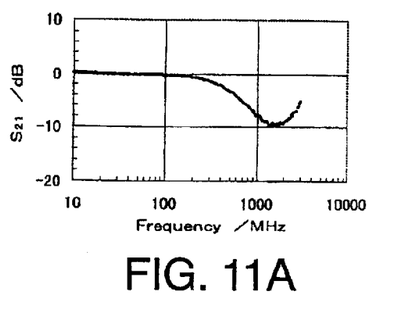
FIG. 11A is a graphic view showing a transmission characteristic of film sample 1.
Figure 11B:
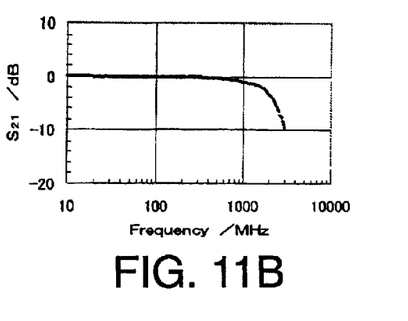
FIG. 11B is a graphic view showing a transmission characteristic of comparable sample of composite magnetic material sheet.

With respect to use of film sample 1, it will be noted from FIG. 11A that S21 reduces above 100 MHz, becomes to the minimum of −10 dB at a frequency of 2 GHz and then increases above 2 GHz. On the other hand, with respect to use of comparative sample, it will be noted from FIG. 11B that S21 gradually reduces and becomes to the minimum of −10 dB at a frequency of 3 GHz.

The results demonstrate that S21 is dependent on the frequency distribution of the permeability and that the noise suppressing effect is dependent on the product of ($\mu''_{max}×\delta$).

Figure 12A:
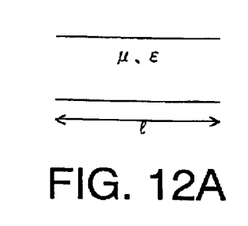
FIG. 12A is a distribution constant circuit with a length $\ell$ showing a magnetic material as a noise suppressor.
Figure 12B:
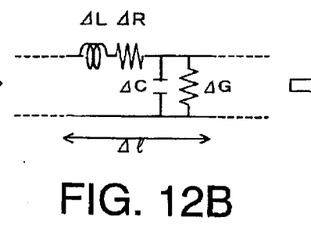
FIG. 12B is an equivalent circuit with a unit length $\Delta\ell$ of the distribution constant circuit of FIG. 12A.
Figure 12C:
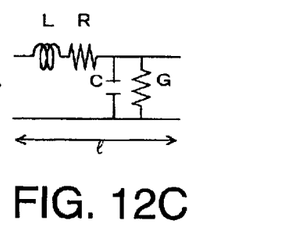
FIG. 12C is an equivalent circuit with a length $\ell$ of the distribution constant circuit of FIG. 12A.

Now, providing that the magnetic sample forms a distribution constant circuit having a length of l as shown in FIG. 12A, an equivalent circuit was calculated for a unit length of Δl from transmission characteristics S11 and S21, as shown in FIG. 12B. Then, the equivalent circuit for the length l was obtained from the equivalent circuit for the unit length Δl, as shown in FIG. 12C. The equivalent circuit of the magnetic sample comprises series inductance L and resistance R and parallel capacitance C and conductance G, as shown in FIG. 12C. From this, it will be understood that the change of transmission characteristic of the micro-strip line caused due to disposition of the magnetic substance on the micro-strip line is mainly determined by the equivalent resistance R added in series.

Figure 13A:
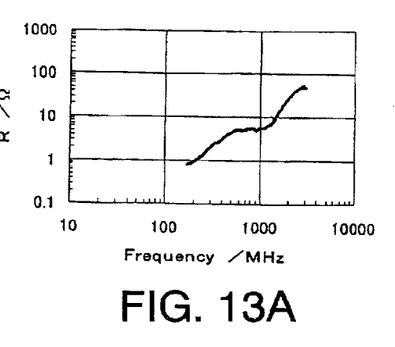
FIG. 13A is a graphic view showing a frequency response of an equivalent resistance R of film sample 1 in Example 1.
Figure 13B:
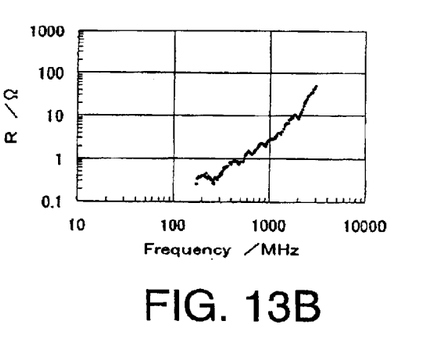
FIG. 13B is a graphic view showing a frequency response of an equivalent resistance R of comparative sample of a composite magnetic material sheet.

In view of the above, a frequency response of the equivalent resistance R was measured. The measured data were shown in FIGS. 13A and 13B for the film sample 1 and the comparative sample, respectively. It will be noted from these figures that the equivalent resistance R gradually reduces in the quasi-microwave range and is about 60 ohms at about 3 GHz. It is seen that the frequency dependency of the equivalent resistance R is different from that of the imaginary part of relative permeability which has the maximum value at about 1 GHz. It will be supposed that this difference will be based on the gradual increase of a ratio of the product and the sample length to the wavelength.

What is claimed is:

1. A heat-shrinkable tube comprising:
   a tubular member being shrinkable in response to heat and having a cylindrical surface; and
   a thin film formed on at least a part of said cylindrical surface and being made of a magnetic loss material which has a high magnetic loss characteristic, said thin film having:
   a first phase comprising a first element selected from the group consisting of Fe, Co, and Ni; and
   a second phase comprising an element other than Fe, Co, and Ni.

2. The heat-shrinkable tube according to claim 1, wherein said first phase further comprising comprises, as a second element, another one of Fe, Co, and Ni, said second element being mixed with said first element.

3. The heat-shrinkable tube according to claim 2, wherein said first phase further comprises, as a third element, a remaining one of Fe, Co, and Ni, said third element being mixed with said first and said second elements.

4. The heat-shrinkable tube according to claim 1, where said second phase is continuous, said first phase being dispersed in said second phase.

5. The heat-shrinkable tube according to claim 1, wherein said thin film is made of a magnetic substance being a magnetic composition comprising M, X and Y, wherein M is a metallic magnetic material consisting of Fe, Co, and/or Ni, X being element or elements other than M and Y, and Y being F, N, and/or O, in the composition such that said M-X-Y magnetic composition has a saturation magnetization of 35% to 80% of that of the metallic bulk of the magnetic material comprising M alone, said magnetic composition having a maximum value $\mu''_{max}$ of an imaginary part $\mu''$ of relative permeability in a frequency range of 0.1 GHz to 10 GHz.

6. A heat-shrinkable sheet comprising:
a sheet member being shrinkable in response to heat and having a flat surface; and
a thin film formed on at least a part of said flat surface and made of a magnetic loss material which as a high magnetic loss characteristic,
said thin film having:
a first phase comprising a first one of Fe, Co, and Ni; and
a second phase comprising an insulator containing at least one element other than Fe, Co, and Ni.

7. The heat-shrinkable sheet according to claim 6, wherein said first phase further comprising a second one of Fe, Co, and Ni, said second one being mixed to said first one.

8. The heat-shrinkable sheet according to claim 7, wherein said first phase further comprising a third one of Fe, Co, and Ni, said third one being mixed to said first and said second ones.

9. The heat-shrinkable sheet according to claim 6, wherein said second phase is continuous, said first phase being dispersed in said second phase.

10. The heat-shrinkable sheet according to claim 6, wherein said thin film is made of a magnetic substance of a magnetic composition comprising M, X and Y, where M is a metallic magnetic material consisting of Fe, Co, and/or Ni, X being element or elements other than M and Y, and Y being F, N, and/or 0, said M-X-Y magnetic composition having a concentration of M in the composition so that said M-X-Y magnetic composition has a saturation magnetization of 35–80% of that of the metallic bulk of magnetic material comprising M alone, said magnetic composition having the maximum value $\mu''_{max}$ of an imaginary part $\mu''$ of relative permeability in a frequency range of 0.1–10 gigahertz (GHz).

11. A method of shrink the heat-shrinkable sheet as claimed in claim 6, comprising the steps of:
disposing an oscillator in the vecinity of said thin film; and
making said oscillator irradiate electromagnetic radiation towards said thin film, so that said thin film generates said heat.

12. A method of shrinking a heat-shrinkable sheet as climed in claim 6, comprising the steps of:
disposing a conductive wire in vicinity of said thin film; and
supplying an alternating current to said conductive wire to make said conductive wire irradiate electromagnetic radiation towards said thin film, so that said thin film generates said heat.

13. A method of shrinking a heat-shrinkable tube comprising:
providing a tubular member being shrinkable in response to heat and having a cylindrical surface,
a thin film formed on at least a part of said cylindrical surface and being made of a magnetic loss material which as a high magnetic loss characteristic, said thin film having
a first phase comprising at least one of Fe, Co, and Ni, and
a second phase comprising at least one element other than Fe, Co, and Ni;
said shrinking method comprising the steps of:
disposing an oscillator in the vicinity of said thin film; and
making said oscillator irradiate electromagnetic radiation towards said thin film, so that said thin film generates said heat.

14. A method of shrinking a heat-shrinkable tube as comprising:
providing a tubular member being shrinkable in response to heat and having a cylindrical surface,
a thin film formed on at least a part of said cylindrical surface and being made of a magnetic loss material which as a high magnetic loss characteristic, said thin film having
a first phase comprising at least one of Fe, Co, and Ni, and
a second phase comprising at least one element other than Fe, Co, and Ni;
said shrinking method comprising the steps of:
disposing a conductive wire in the vicinity of said thin film; and
supplying an alternating current to said conductive wire to make said conductive wire irradiate electromagnetic radiation towards said thin film, so that said thin film generates heat.

15. A heat-shrinkable device, comprising:
a member having a desired geometry defining a surface and being shrinkable in response to heal and having a cylindrical surface; and
a thin film formed on at least a part of said surface and being made of a magnetic loss material which has a high magnetic loss characteristic,
said thin film having:
a first phase comprising a first element selected from the group consisting of Fe, Co, and Ni; and
a second phase comprising an element other than Fe, Co, and Ni.

16. A method of shrinking a heat-shrinkable device, comprising:
providing a device having a desired geometry defining a surface and being shrinkable in response to heat,
a thin film formed on at least a part of said surface and being made of a magnetic loss material which as a high magnetic loss characteristic, said thin film having
a first phase comprising at least one of Fe, Co, and Ni, and
a second phase comprising at least one element other than Fe, Co, and Ni;
said shrinking method comprising the steps of:
disposing a second device in the vicinity of said heat-shrinkable device, said second device capable of irradiating electromagnetic radiation; and
irradiating the heat-shrinkable device with the second device effective to generate heat in said thin film and shrink the heat-shrinkable device.

* * * * *